United States Patent [19]

Ross

[11] Patent Number: 5,567,201
[45] Date of Patent: Oct. 22, 1996

[54] FIVE-SPEED TRANSMISSION ASSEMBLY EMPLOYING COMPOUNDED PLANETARY GEAR SETS

[75] Inventor: Craig S. Ross, Troy, Mich.

[73] Assignee: General Motors Corporation, Detroit, Mich.

[21] Appl. No.: 327,944

[22] Filed: Oct. 24, 1994

[51] Int. Cl.$^6$ .................................................... F16H 3/44
[52] U.S. Cl. ............................ 475/280; 475/284; 475/289
[58] Field of Search .................................... 475/269, 271, 475/280, 282, 284, 286, 288, 290

[56] References Cited

U.S. PATENT DOCUMENTS

| | | | |
|---|---|---|---|
| 2,813,437 | 11/1957 | Kelbel et al. | 475/280 |
| 3,031,901 | 5/1962 | Simpson | 475/289 |
| 4,296,646 | 10/1981 | Thornton | 475/284 X |
| 4,638,688 | 1/1987 | Hiraiwa | 475/284 X |
| 4,658,672 | 4/1987 | Michael | 475/289 |
| 5,013,289 | 5/1991 | Van Mannen | 475/286 |
| 5,224,908 | 7/1993 | Nishida et al. | 475/282 X |

*Primary Examiner*—Khoi Q. Ta
*Attorney, Agent, or Firm*—Donald F. Scherer

[57] ABSTRACT

A transmission assembly having an input shaft, an output shaft as well as first and second planetary gear sets. The first and second planetary gear sets each have three gear members. Two of the gear members in each planetary gear set are a sun gear and a ring gear. As such, the sun and ring gears, one in each planetary gear set, are paired. The sun and ring gears in each of the first and second planetary gear sets are operatively connected in each respective planetary gear set through the third gear members, which are in the nature of a plurality of planet gears mounted on respective first and second carriers. In one of the planetary gear sets the planet gears are themselves compounded. One of the pairs of sun and ring gears is continuously connected, and the carrier in the first planetary gear set is selectively, and independently, connected to two gear members in the second planetary gear set. The carrier in the second planetary gear set is continuously connected to the output shaft means.

11 Claims, 2 Drawing Sheets

| TORQUE TRANSFER DEVICES | | | | | | | |
|---|---|---|---|---|---|---|---|
| DRIVE RANGE/RATIO | 50A | 50B | 50C | 50D | 50E | 50F | 50G |
| 1 | X |  |  |  | X | X |  |
| 2 |  | X |  |  | X | X |  |
| 3 |  | X |  |  | X |  | X |
| 4 | X | X |  |  |  |  | X |
| 5 |  | X | X |  |  |  | X |
| R | X |  |  | X |  | X |  |

| | TORQUE TRANSFER DEVICES | | | | | | |
|---|---|---|---|---|---|---|---|
| | 150A | 150B | 150C | 150D | 150E | 150F | 150G |
| DRIVE RANGE/RATIO  1 | | X | | | X | | X |
| 2 | | X | | X | | | X |
| 3 | | X | X | | | | X |
| 4 | | | X | X | | | X |
| 5 | | | X | X | | X | |
| R | X | | | | X | X | |

5,567,201

FIVE-SPEED TRANSMISSION ASSEMBLY EMPLOYING COMPOUNDED PLANETARY GEAR SETS

TECHNICAL FIELD

The present invention relates generally to automatic transmissions for vehicles. More particularly, the present invention relates to a planetary or epicyclic transmission assembly, wherein a pair of compounded planetary gear sets provide five forward speeds and one reverse speed by selective actuation of one or more of a plurality of torque transfer devices in the nature of clutch members and brake members. Specifically, the present invention relates to a five-speed planetary transmission assembly having a pair of planetary gear sets; one of the planetary gear sets includes compounded planet gears, and the planetary gear sets have either conjoined sun gears or conjoined ring gears.

BACKGROUND OF THE INVENTION

The present invention relates to what is commonly designated as a five-speed automatic transmission that is particularly adapted for vehicular usage. That is, the transmission provides five forward speeds or gear ratios, and one reverse speed or gear ratio. By way of introduction, and to clarify the discussion which follows, the forward gear ratios are defined as those ratios which causes the vehicle to move forwardly, and, for simplicity, it will be assumed that the configuration of the planetary gear sets is such that in a forward gear ratio the output member rotates in the same direction as the input member. Conversely, the reverse ratio causes the vehicle to move rearwardly, and it will also be assumed that the output member rotates in a direction opposite to that of the input member.

As is also known, an input member is a connecting mechanism (normally a shaft in the transmission) which receives its driving force or torque from the vehicular engine—as through a well known torque converter—and imparts the driving torque to the planetary gear sets which comprise the epicyclic transmission. The output member operatively connects the transmission to the differential from which the drive wheels are rotated.

"Torque transfer device" is another term commonly employed in the description of planetary gear sets. Two forms of torque transfer devices are commonly recognized—viz.: clutch members and brake members. An input clutch member is employed selectively to interconnect two members that are normally relatively rotatable so that they move in unison. A brake member is employed selectively to preclude rotation of a member that is mounted so as be rotatable. Typically, a brake member is presented from the housing in which the transmission is encased, and the brake member thereby serves to "ground" a normally rotatable member to the housing so that member cannot rotate. As will be hereinafter described, in one embodiment of the present invention at least one torque transfer device sometimes operates as a clutch an sometimes as a brake.

A planetary gear set typically consists of a sun gear, which is a small gear located in the center of the planetary set, and a ring gear which, as the outermost member, circumscribes the set and has inwardly-facing teeth. A plurality of planet gears or pinions are interposed between the aforementioned sun and ring gears to be rotatable and/or circumferentially translatable. The planet gears in each planetary gear set are normally supported from a carrier that will rotate in response to translation of the planet gears. Conversely, the carrier may be rotated to effect a desired movement of the planet gears.

Rotation of the sun gear will cause all of the other elements in the planetary set to move, as well, unless one of the other elements is held stationary by a torque transfer device such as a brake member which may be presented from the transmission housing. When a brake member grounds one of the components in a planetary gear set to the housing, the grounded member will be forcibly held in position so that all the other members are movable relative thereto. Selectively grounding the members of a planetary gear set in combination with selectively connecting the input shaft to the desired component of the planetary gear set constitutes the typical means by which different gear ratios are achieved from a planetary gear set—i.e.: different members are selected to be rotated or grounded so the speed and direction of the output can be appropriately changed to accommodate the existing conditions.

There is, however, a limit to the number of variations which can be provided by a single planetary set. As a result, planetary gear sets have been compounded to provide a greater number of individual speeds or gear ratios. When planetary gear sets are compounded, various torque transfer devices are provided to effect selective interconnection between the members of the individual gear sets as well as to ground one or more of the components of the gear sets to the transmission housing. These arrangements, while successful, do tend to increase the length of the housing required to encase not only the gear sets but also the torque transfer devices required to provide the desired number of gear ratios.

SUMMARY OF THE INVENTION

It is, therefore, a primary object of the present invention to provide an improved five-speed transmission by selectively compounding only two planetary gear sets.

It is another object of the present invention to provide an improved five-speed transmission, as above, which may be readily incorporated in a housing having lesser overall dimensions than might be expected from the prior art.

It is a farther object of the present invention to provide an improved five-speed transmission, as above, which employs a pair of compounded planetary gear sets wherein at least one of the planetary gear sets has compounded planet gears—i.e.: one set of planet gears meshingly engage the sun gear and a second set of planet gears meshingly engage the ring gear, but both sets of planet gears meshingly engage each other.

It is still another object of the present invention to provide an improved five-speed invention, as above, wherein the compounded planetary gear sets are operated by the selective actuation of seven torque transfer devices.

It is an even further object of the present invention to provide an improved five-speed transmission, as above, wherein the sun gears of the two planetary gear sets are continuously conjoined in one embodiment and the ring gears of the two planetary gear sets are continuously conjoined in an alternative embodiment.

These and other objects of the invention, as well as the advantages thereof over existing and prior art forms, which will be apparent in view of the following detailed specification, are accomplished by means hereinafter described and claimed.

In general, a transmission assembly embodying the concepts of the present invention may be categorized as a five-speed epicyclic gear train that has an input shaft means, an output shaft means and first and second planetary gear sets. The first and second planetary gear sets each have three gear means. Two of the gear means in each planetary gear set are a sun gear and a ring gear. The sun and ring gears in each of the first and second planetary gear sets are operatively connected in each respective planetary gear set through the third gear means, which is in the nature of a plurality of planet gears mounted on respective first and second carriers. In one of the planetary gear sets the planet gears are themselves compounded.

One of the pairs of sun and ring gears is continuously connected, and the carrier in the first planetary gear set is selectively, and independently, connected to two gear means in the second planetary gear set. One of the carriers is continuously connected to the output shaft means.

To acquaint persons skilled in the arts most closely related to the present invention, two preferred embodiments of a transmission assembly that illustrate two best modes now contemplated for putting the invention into practice are described herein by, and with reference to, the annexed drawings that form a part of the specification. The exemplary transmission assemblies are described in detail without attempting to show all of the various forms and modifications in which the invention might be embodied. As such, the embodiments shown and described herein are illustrative, and as will become apparent to those skilled in these arts can be modified in numerous ways within the spirit and scope of the invention; the invention being measured by the appended claims and not by the details of the specification.

DESCRIPTION OF AN EXEMPLARY EMBODIMENT

Figures 1, 2:
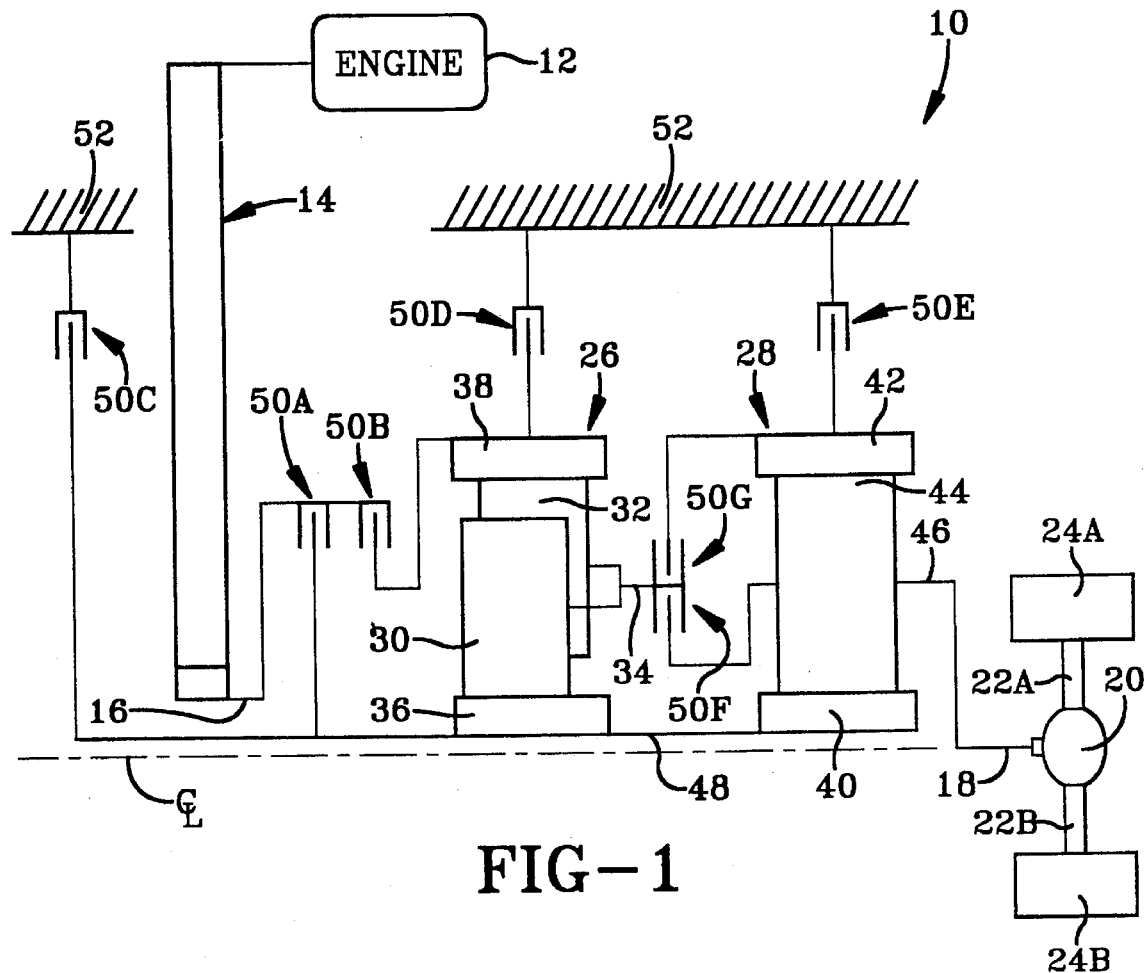
FIG. 1 is a diagrammatic representation of one form of a transmission assembly embodying the concepts of the present invention, the transmission assembly incorporating a uniquely compounded planetary gear set one half of which is depicted—the other half being the mirror image of the half depicted above the centerline designated as L.
FIG. 2 is a chart depicting those torque transfer devices that are engaged to select a given drive range, and/or drive ratio, in the transmission assembly depicted in FIG. 1.

One representative form of a vehicular transmission assembly embodying the concepts of the present invention is designated generally by the numeral 10 on FIG. 1 of the accompanying drawings. The representative vehicular transmission assembly 10 employs a compounded epicyclic—or planetary—gear set which, as is well known to the art, typically receives input torque from an engine 12 that is drivingly connected—as through a chain drive assembly 14—to an input shaft 16. As is also commonly known, an output shaft 18 extends outwardly from the transmission assembly 10 and may be connected, as through a differential 20, to the right and left drive axles 22A and 22B, respectively, of the vehicle (not shown), the right and left drive wheels 24A and 24B being mounted on the respective left and right axles 22A and 22B.

As previewed in the previous paragraph, a particular structural member, component or arrangement may be employed at more than one location. When referring generally to that type of structural member, component or arrangement a common numerical designation shall be employed. However, when one of the structural members, components or arrangements so identified is to be individually identified, it shall be referenced by virtue of a letter suffix employed in combination with the numerical designation employed for general identification of that structural member, component or arrangement. Thus, them are at least two axles which are generally identified by the numeral 22, but the specific individual axles are, therefore, identified as 22A and 22B in the specification and on the drawings. This suffix convention shall be employed throughout the specification.

With continued reference to FIG. 1, the transmission assembly 10 utilizes compounded first and second planetary gear sets 26 and 28, and the first planetary gear set 26 may have a compounded plurality of planet gears 30 and 32 supported on a single carrier 34. As such, the sun gear 36 of the first planetary gear set 26 is in continuous meshing engagement with the planet gears 30, and the ring gear 38 of the first planetary gear set 26 is in continuous meshing engagement with the planet gears 32. The planet gears 30 and 32 are also in continuous meshing engagement with each other.

The second planetary gear set 28 is a standard arrangement in that the sun gear 40 and ring gear 42 both meshingly engage a plurality of planet gears 44 that are rotatably supported on a carrier 46.

In the first exemplary embodiment of the transmission assembly 10, the sun gear 36 of the first planetary gear set 26 is permanently secured to the sun gear 40 of the second planetary gear set 28, as by a common sun gear shaft 48.

The input shaft 16 is selectively connectable to the common sun gear shaft 48 by a torque transfer device 50A which, as depicted, may be in the nature of a clutch. The input shaft 16 is also selectively connectable to the ring gear 38 of the first planetary gear set 26 by a torque transfer device 50B which, as depicted, may also be in the nature of a clutch. The common sun gear shaft 48, in addition to being selectively connectable to the input shaft 16 through torque transfer device 50A, is also selectively connectable to ground, designated at 52, by a torque transfer device 50C which, as depicted, may be in the nature of a brake.

The ring gear 38 of the first planetary gear set 26, as well as the ring gear 42 of the second planetary gear set 28, are also selectively, and individually, connectable to ground 52 by the torque transfer devices 50D and 50E, respectively, which may, as depicted, be in the nature of brakes.

The first and second planetary gear sets 26 and 28 are further compounded in that the carrier 34 of the first planetary gear set 26 is selectively, and individually, connectable to the carrier 46 of the second planetary gear set 28, as by a torque transfer device 50F, which, as depicted, is in the nature of a clutch. The carrier 34 of the first planetary gear set 26 is also selectively, and individually, connectable to the ring gear 42 of the second planetary gear set 28 by a torque transfer device 50G which, as depicted, serves as either a clutch or a brake depending upon the state of the ring gear 42—i.e.: whether the ring gears 42 is rotatable or grounded.

General Observations on Operation

By way of background, it should be understood that motor vehicle transmissions generally include selectively operable gear elements for providing multiple forward speed ratios through which the output torque of the engine is applied to the drive wheels of the vehicle. In automatic transmissions employing planetary gear sets, the gear members in the planetary gear sets are selectively interconnected to each other and/or grounded in order to provide the various speed ratios. The selective interconnection may be readily accomplished through torque transfer devices such as clutches and brakes.

Thus, shifting from one speed ratio to another generally involves releasing (disengaging) the torque transfer device(s) associated with the current speed ratio and applying (engaging) the torque transfer device(s) associated with the desired speed ratio. Any torque transfer device to be released during a particular shift sequence is conventionally referred to as the off-going torque transfer device while the torque transfer device to be applied during that same shift sequence is referred to as the on-coming torque transfer device.

There is generally a slight overlap between the "release" and "apply" of the torque transfer devices involved in a shift sequence, and high quality shifts are achieved only when the "release" and "apply" operations are properly timed and executed.

Conventionally, the shifting control effected by an automatic transmission is performed in conjunction with a logic control map and various inputs which reflect such system parameters as vehicle speed, engine throttle position and engine torque. Fluid pressure signals representative of the various system parameters are processed in an on-board computer and/or microprocessor to determine when a shift is in order and to actuate, in accordance with the logic control map, electronically controlled valves in the hydraulic control system which respond to the signals received from the computer to effect the required engagement and/or disengagement (and in the proper order) of the appropriate torque transfer devices necessary to secure the desired speed ratio changes to the output shaft of the transmission.

To facilitate an understanding of the sequencing for the torque transfer devices 50 by which the drive range, forward or reverse, as well as the drive ratios in the forward drive range are accomplished in the improved transmission assembly 10, a sequencing chart is provided in FIG. 2. Those torque transfer devices which must be engaged in order to effect each drive ratio are designated with an "X" on FIG. 2. One can, therefore, refer either to the chart in FIG. 2 and/or the description which follows to determine how each drive ratio is achieved.

It will be observed from the chart set forth on FIG. 2 that the present transmission assembly 10 employs what is commonly designated as a single transition shift. That is, only one torque transfer device 50 is off-going and one torque transfer device 50 is on-coming to effect a change to the next successive drive ratio, during either an up-shift or a down-shift.

Operation of the First Exemplary Embodiment

Actuation of the First Forward Drive Ratio

The first gear ratio (the highest torque, lowest speed output) is enabled by establishing a driving connection between the input shaft 16 and the common sun drive shaft 48 through the engagement of torque transfer device 50A. As such, the conjoined sun gears 36 and 40 constitute the input member. The torque transfer device 50E is engaged to ground the ring gear 42 in the second planetary gear set 28 and thereby establish the ring gear 42 as the reaction member. The torque transfer device 50F is also enabled to connect the carrier 34 of the first planetary gear set to the carrier 46 of the second planetary gear set 28, thereby further compounding the two planetary gear sets 26 and 28. The aforesaid arrangement achieves the slowest forward movement of the vehicle with the highest torque output delivered by the output shaft 18.

Actuation of the Second Forward Drive Ratio

To achieve the second forward drive ratio, the single transition shift effects a release of torque transfer device 50A and a timed engagement of torque transfer device 50B. In this arrangement, the ring gear 42 in the second planetary gear set 28 remains the reaction member, but the input changes from the conjoined sun gears 36 and 40 to the ring gear 38 in the first planetary gear set 26. Hence, the single transition is the change of the input member.

In the operation of the second drive ratio, it should be appreciated that the conjoined sun gears 36 and 40 interact, through the planet gears 44, with the load on the output shaft 18 to provide the necessary reaction against the compounded planet gears 30 and 32 on the single carrier 34 in the first planetary gear set 26 to convert the input applied to the ring gear 38 to a driving output through the output shaft 18. As such, the system incorporates a regenerative aspect.

Actuation of the Third Forward Drive Ratio

To achieve the third forward drive ratio, the single transition shift effects a release of torque transfer device 50F and a timed engagement of torque transfer device 50G. In this arrangement, the ring gear 42 in the second planetary gear set 28 remains the reaction member, but the engagement of torque transfer device 50G includes the carrier 34 as an integral component of the reaction member. The input member remains the ring gear 38 in the first planetary gear set 26. Hence, the single transition shift is the disengagement of the carrier 46 from the carrier 34 in conjunction with the engagement of the ring gear 42 with the carrier 34. As such, the input to the ring gear 38 in the first planetary gear set 26 is transmitted through the compounded planet gears 30 and 32 to the conjoined sun gears 36 and 40, and the sun gear 40 drives the carrier 46 against the direct reaction of the grounded ring gear 42 to provide the third forward drive ratio.

Actuation of the Fourth Forward Drive Ratio

To achieve the fourth forward drive ratio, the single transition shift effects a release of torque transfer device 50E and a timed engagement of torque transfer device 50A. In this arrangement, the input shaft 16 simultaneously drives not only the conjoined sun gears 36 and 40 but also the ring gear 38 in the first planetary gear set 26. Under that arrangement, the carrier 34 in the first planetary gear set 26 rotates in unison with the sun and ring gears 36 and 38, respectively. By having disengaged the ring gear 42 of the second planetary gear set 28 from ground 52, and having effected a driving connection between the carrier 34 in the first planetary gear set 26 with the ring gear 42 of the second planetary gear set 28, the sun and ring gears 40 and 42, respectively, in the second planetary gear set 28 also rotate in unison with the sun and ring gears 36 and 38 in the first planetary gear set 26. This rotates the carrier 46 in the second planetary gear set 28 at a 1:1 ratio with the carrier 34 in the first planetary gear set 26. Accordingly, the fourth forward drive ratio is a direct drive.

Actuation of the Fifth Forward Drive Ratio

To achieve the fifth forward drive ratio, the single transition shift effects a release of torque transfer device 50A and a timed engagement of torque transfer device 50C. In this arrangement, the conjoined sun gears 36 and 40 are disconnected from the input shaft 16 and are grounded. As such, only the ring gear 38 in the first planetary gear set 26 remains as the input member, and the driving connection between the carrier 34 in the first planetary gear set 26 is maintained. Accordingly, the ring 38 in the first planetary gear set 26 drives the compounded planet gears 30 and 32 against the grounded sun gear 36 to rotate the carrier 34. The carrier 34, in turn rotates the ring gear 42 in the second planetary gear set 28, and with the sun gear 40 grounded, rotation of the ring gear 42 co-rotates the carrier 46 to drive the output shaft 18 in the fifth forward drive ratio. The fifth forward drive ratio is an overdrive.

One should be careful in analyzing the rotation of the carrier 34 in the fifth forward drive range because, without an accurate analysis, it may not appear to rotate in the direction required to effect operation of the transmission in the forward drive range. Should one wish to verify the true direction in which the carrier 34 rotates, it is suggested that a stick diagram analysis be employed, as is well known to the art.

Actuation of the Reverse Drive Range

To achieve the reverse drive range, torque transfer devices 50A, 50D and 50F are engaged. Torque transfer device 50A connects the input shaft 16 to the conjoined sun gears 36 and 40 through sun shaft 48, making the sun gears the input members. Engagement of torque transfer device 50D grounds the ring gear 38 of the first planetary gear set 26 such that it becomes the reaction member. Engagement of torque transfer device 50F connects the carriers 34 and 46. In this arrangement, the carrier 34 rotates in a direction opposite to the direction in which the sun gear 36 is rotating, and that rotation is transferred directly to the carrier 46 of the second planetary gear set 28 through torque transfer device 50F. Inasmuch as ring gear 42 is free to rotate, the rotation of the sun gear 40 has no effect on the rotation of the carrier 46. Accordingly, the carrier 46 rotates in the same direction as the carrier 34, thus effecting the reverse drive range.

Description of an Alternative Embodiment

Figures 3, 4:
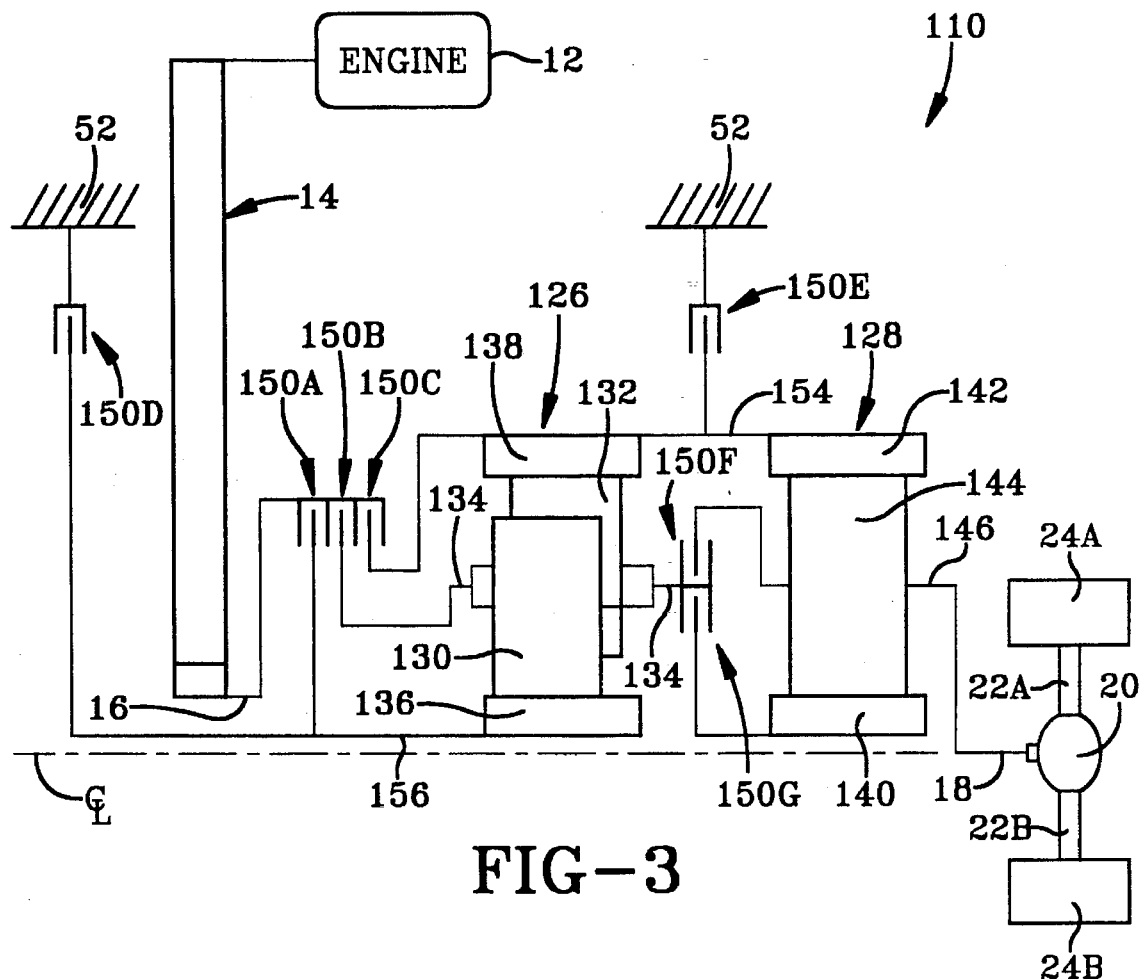
FIG. 3 is a diagrammatic representation of an alternative form of a transmission assembly embodying the concepts of the present invention, the transmission assembly incorporating a uniquely compounded planetary gear set one half of which is depicted—the other half being the mirror image of the half depicted above the centerline designated as L; and, FIG. 4 is a chart depicting those torque transfer devices that are engaged to select a given drive range, and/or drive ratio, in the transmission assembly depicted in FIG. 3.

A second representative form of a vehicular transmission assembly embodying the concepts of the present invention is designated generally by the numeral 110 on FIG. 3 of the accompanying drawings. The representative vehicular transmission assembly 110 also employs a compounded epicyclic—or planetary—gear set which, as is well known to the art, typically receives input torque from an engine 12 that is drivingly connected—as through a chain drive assembly 14—to an input shaft 16. As is also commonly known, an output shaft 18 extends outwardly from the transmission assembly 110 and may be connected, as through a differential 20, to the right and left drive axles 22A and 22B, respectively, of the vehicle (not shown)—the right and left drive wheels 24A and 24B being mounted on the respective right and left axles 22A and 22B.

The transmission assembly 110 utilizes compounded first and second planetary gear sets 126 and 128, and the first planetary gear set 126 may have compounded planet gears 130 and 132 supported on a single carrier 134. As such, the sun gear 136 of the first planetary gear set 126 is in continuous meshing engagement with the planet gears 130, and the ring gear 138 of the first planetary gear set 126 is in continuous meshing engagement with the planet gears 132. The planet gears 130 and 132 are also in continuous meshing engagement with each other.

The second planetary gear set 128 is a standard arrangement in that the sun gear 140 and ring gear 142 both meshingly engage a plurality of planet gears 144 that are rotatably supported on a carrier 146.

In the second exemplary embodiment of the transmission assembly 110, the ring gear 138 of the first planetary gear set 126 is permanently secured to the ring gear 142 of the second planetary gear set 128, as by a common ring gear shaft 154.

The input shaft 16 is selectively connectable to the shaft portion 156 of sun gear 136 by a torque transfer device 150A which, as depicted, may be in the nature of a clutch. The input shaft 16 is also selectively connectable to the carrier 134 of the first planetary gear set 126 by a torque transfer device 150B which, as depicted, may also be in the nature of a clutch. The common ring gear shaft 154, in addition to being selectively connectable to the input shaft 16 through torque transfer device 150C, is also selectively connectable to ground, designated at 52, by a torque transfer device 150E which, as depicted, may be in the nature of a brake.

The sun gear 136 of the first planetary gear set 126 is also selectively connectable to ground 52 by the torque transfer device 150D which may, as depicted, be in the nature of a brake.

The first and second planetary gear sets 126 and 128 are further compounded in that the carrier 134 of the first planetary gear set 126 is selectively connectable to the carrier 146 of the second planetary gear set 128, as by the torque transfer device 150F, which, as depicted, is in the nature of a clutch. The carrier 134 of the first planetary gear set 126 is also selectively, and individually, connectable to the sun gear 140 of the second planetary gear set 128 by torque transfer device 150G which, as depicted, serves as a clutch.

Operation of the Alternative Embodiment

Actuation of the First Forward Drive Ratio

The first gear ratio (the highest torque, lowest speed output) is enabled by establishing a driving connection between the input shaft 16 and the carrier 134 through the engagement of torque transfer device 150B. As such, the carrier 134 constitute the input member. The torque transfer device 150E is engaged to ground the conjoined ring gears 138 and 142 and thereby establish those conjoined gears as the reaction member. The torque transfer device 150G is engaged to connect the carrier 134 of the first planetary gear set 126 to the sun gear 140 of the second planetary gear set 128. The aforesaid arrangement achieves the slowest forward movement of the vehicle with the highest torque output delivered by the output shaft 18.

Actuation of the Second Forward Drive Ratio

To achieve the second forward drive ratio, the single transition shift effects a release of torque transfer device 150E and a timed engagement of torque transfer device 150D. In this arrangement, the sun gear 136 in the first planetary gear set 126 is grounded to become the reaction member, but the input member remains the carrier 134 in the first planetary gear set 126. Hence, the single transition effects a change of the reaction member.

In the operation of the second drive ratio, the planet gears 130 supported from the carrier 134 react against the grounded sun gear 136 in the first planetary gear set 126 to rotate the carrier 134 unfettered from any reaction with the conjoined ring gears 138 and 142 which are free to rotate. The carrier 134 thus rotates the sun gear 140 in the second planetary gear set 128. The sun gear 140, in turn, rotates the planet gears 144 supported from the carrier 146 in the second planetary gear set 128. However, a reaction is imposed on the planet gears 144 by the fact that the ring gears 138 and 142 are conjoined. Thus, the attempt of the ring gear 142 to rotate freely is resisted by the meshing engagement of the ring gear 138 with the planet gears 132—the rotation of which is controlled by rotation of the planet gear 130 against the grounded sun gear 136. Accordingly, the input applied to the carrier 134 is converted to a driving output through the output shaft 18. It should be recognized, therefore, that the present transmission assembly also incorporates a regenerative aspect.

Actuation of the Third Forward Drive Ratio

To achieve the third forward drive ratio, the single transition shift effects a release of torque transfer device 150D and a timed engagement of torque transfer device 150C. In this arrangement, a direct drive is achieved. Specifically, the carrier 134 and the ring gear 138 in the first planetary gear set 126 are both rotated in unison against a free sun gear 136. The fact that the ring gears 138 and 142 are conjoined causes both ring gears to rotate at the same rate. Moreover, the rotatable connection of the carrier 134 in the first planetary gear set 126 with the sun gear 140 in the second planetary gear set 128 causes the sun gear 140 to rotate at the same rate as the ring gear 142. This drives the carrier 146 at the same rate. Hence, the rotational rate of the input shaft 16 is equal to the rotational rate of the output shaft 18, and a direct drive is provided by the third drive ratio.

Actuation of the Fourth Forward Drive Ratio

To achieve the fourth forward drive ratio, the single transition shift effects a release of torque transfer device 150B and a timed engagement of torque transfer device 150D. In this arrangement, the input shaft 16 continues to drive the conjoined ring gears 138 and 142 in the respective first and second planetary gear sets 126 and 128. The ring gears 138 and 142 thus remain the input members. Engagement of torque transfer device 150D serves to ground the sun gear 136 in the first planetary gear set 126, which, therefore, becomes the reaction member. Under that arrangement, rotation of the ring gear 138 relative to the grounded sun gear 136 rotates the sun gear 140 in the second planetary gear set 128. With both the ring gear 142 and the sun gear 140 in the second planetary gear set 128 rotating in the same direction, but at different rates (as determined by the ratio of the teeth on the compounded planet gears 130 and 132 in the first planetary gear set 126), the carrier 146 in the second planetary gear set 128 may rotate at even a faster rate that the ring 142, thus causing the fourth forward drive ratio to be an overdrive ratio.

Actuation of the Fifth Forward Drive Ratio

To achieve the fifth forward drive ratio, the single transition shift effects a release of torque transfer device 150G and a timed engagement of torque transfer device 150F. In this arrangement, the conjoined ring gears 138 and 142 remain the input member and the grounded sun gear 136 remains the reaction member. However, the carrier 134 in the first planetary gear set 126 is connected to the carrier 146 in the second planetary gear set 128. Accordingly, the ring gear 138 in the first planetary gear set 126 drives the compounded planet gears 130 and 132 against the grounded sun gear 136 to rotate the carrier 134. The carrier 134, in turn, rotates the carrier 146 in the second planetary gear set 128 relative to the ring gear 142 that is already rotating with the conjoined ring gear 138 at the input rate. Hence, if the planet gears 130 and 132 are chosen to provide an overdrive ratio in the fourth forward drive ratio, the fifth drive ratio is a second overdrive ratio.

Actuation of the Reverse Drive Range

To achieve the reverse drive range, torque transfer devices 150A, 150E and 150F are engaged. Torque transfer device 150A connects the input shaft 16 to the sun gear 136 in the first planetary gear set 126, making the sun gear 136 the input member. Engagement of torque transfer device 150E grounds the conjoined ring gears 138 and 142 such that the ring gears become the reaction member. Engagement of torque transfer device 150F connects the carriers 134 and 146 to conclude the compounding of the first and second planetary gear sets 126 and 128. In this arrangement, the carrier 134 rotates in a direction opposite to the direction in which the sun gear 136 is driven by the input shaft 16, and that rotation is transferred to the connected carrier 146 of the second planetary gear set 128. Inasmuch as the sun gear 140 of the second planetary gear set 128 is free to rotate and the ring gear 142 of that same planetary gears set is grounded, the carrier 146 rotates in the same direction as the carrier 134, thus effecting the reverse drive range.

Closing

While only two preferred embodiments of the present invention are disclosed, it is to be clearly understood that the same is susceptible to numerous changes apparent to one skilled in the art. Therefore, the scope of the present invention is not to be limited to the details shown and described but is intended to include all changes and modifications which come within the scope of the appended claims.

As should now be apparent, the present invention teaches that a five-speed transmission assembly may employ an epicyclic gear train having two uniquely compounded planetary gear sets to accomplish the objects of the invention.

The embodiments of the invention in which an exclusive property or privilege is claimed are defined as follows:

1. A five-speed vehicular transmission assembly comprising:

input shaft means;

output shaft means;

first and second planetary gear sets;

said first and second planetary gear sets each having first, second and third gear means;

said first and second gear means in each planetary gear set being a sun gear and a ring gear such that the transmission assembly has a pair of sun gears and a pair of ring gears, one said sun gear and one said ring gear being included in each planetary gear set;

said sun and ring gears in each said first and second planetary gear sets being operatively connected in each respective planetary gear set through said third gear means;

said third gear means in said first planetary gear set being a plurality of planet gear members mounted on a first carrier;

said third gear means in said second planetary gear set being a plurality of planet gear members mounted on a second carrier;

one of said pairs of sun and ring gears being continuously connected;

another of said pairs of sun and ring gears being relatively rotatable with respect to each other;

said carrier in said first planetary gear set being selectively, and independently, connected to said carrier in said second planetary gear set as well as to that paired gears member in said second planetary gear set that is relatively rotatable with respect to the corresponding member of that same pair in said first planetary gear set;

said carrier in said second planetary gear set being continuously connected to said output shaft means;

a torque transfer device selectively connecting that pair of sun and ring gears which are continuously connected to each other to said input shaft means;

a second torque transfer device selectively grounding that pair of sun and ring gears which are continuously connected; and, a third torque transfer device selectively connecting that gear means in said first planetary gear set that is relatively rotatable with the corresponding gear means in said second planetary gear set to said input shaft means.

2. A five-speed vehicular transmission assembly, as set forth in claim 1, wherein:

said planet gears supported from said carrier in said first planetary gear set are compounded.

3. A five-speed vehicular transmission assembly, as set forth in claim 2, wherein:

that said gear means in said first planetary gear set which is selectively connectable to said input shaft means through said third torque transfer device is also selectively, and independently, connected to ground through a fourth torque transfer device.

4. A five-speed vehicular transmission assembly, as set forth in claim 3, wherein:

said sun gears are continuously connected; and, said ring gear in said second planetary gear set is selectively connected to ground through a fifth torque transfer device.

5. A five-speed vehicular transmission assembly, as set forth in claim 3, wherein:

said ring gears are continuously connected; and, said sun gear in said first planetary gear set is selectively, and independently, connected to said input shaft means.

6. A five-speed vehicular transmission assembly, as set forth in claim 5, wherein:

said sun gear in said first planetary gear set is selectively, and independently, connected to ground.

7. A five-speed vehicular transmission assembly comprising:

input shaft means;

output shaft means;

first and second planetary gear sets;

each planetary gear set having a plurality of planet gears meshingly engaging an inner gear member and an outer gear member;

said inner gear member in each said first and second planetary gear sets constituting one pair of gear members;

said outer gear member in each said first and second planetary gear sets constituting another pair of gear members;

said first planetary gear set having a compound planet set;

one of said pairs of gear members in said first and second planetary gear sets being continuously joined;

a first torque transfer device selectively connecting said input shaft means to said inner gear member in said first planetary gear set;

a second torque transfer device selectively connecting said input shaft means to said outer gear member in said first planetary gear set;

a third torque transfer device selectively grounding said inner gear member of at least said first planetary gear set;

a fourth torque transfer device selectively grounding at least said outer gear member of said first planetary gear set;

a fifth torque transfer device selectively connecting said compound planet set of said first planetary gear set to said gear member in said second planetary gear set that is rotatable selectively with respect to the corresponding gear member in said first planetary gear set;

a sixth torque transfer device selectively connecting said compound planet set in said first planetary gear set to said planet gears in said second planetary gear set; and, said output shaft being connected to said planet set of said second planetary gear set.

8. A five-speed vehicular transmission assembly, as set forth in claim 7, wherein:

said inner gear member of each said first and second planetary gear sets is a sun gear and said sun gears of said first and second planetary gear sets are continuously connected.

9. A five-speed vehicular transmission assembly, as set forth in claim 8, further comprising:

a seventh torque transfer device selectively to ground said outer gear member of said second planetary gear set.

10. A five-speed vehicular transmission assembly, as set forth in claim 7, wherein:

said outer gear member of each said first and second planetary gear sets is a ring gear and said ring gears of said first and second planetary gear sets are continuously connected.

11. A five-speed vehicular transmission assembly, as set forth in claim 10, further comprising:

a seventh torque transfer device selectively to connect said input shaft means to the carrier in said first planetary gear set.

* * * * *